(12) United States Patent
Zhou et al.

(10) Patent No.: US 12,491,698 B2
(45) Date of Patent: Dec. 9, 2025

(54) NON-STRETCH BONDED ELASTIC WITH ELASTIC NET

(71) Applicant: KIMBERLY-CLARK WORLDWIDE, INC., Neenah, WI (US)

(72) Inventors: Peiguang Zhou, Appleton, WI (US); WanDuk Lee, Appleton, WI (US); Davis Dang H. Nhan, Menasha, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 16/326,277

(22) PCT Filed: Aug. 31, 2016

(86) PCT No.: PCT/US2016/049577
§ 371 (c)(1),
(2) Date: Feb. 18, 2019

(87) PCT Pub. No.: WO2018/044286
PCT Pub. Date: Mar. 8, 2018

(65) Prior Publication Data
US 2019/0202165 A1 Jul. 4, 2019

(51) Int. Cl.
*B32B 5/02* (2006.01)
*B32B 7/12* (2006.01)
(Continued)

(52) U.S. Cl.
CPC ............... *B32B 5/028* (2013.01); *B32B 5/02* (2013.01); *B32B 7/12* (2013.01); *B32B 27/12* (2013.01);
(Continued)

(58) Field of Classification Search
CPC .. B32B 5/028; B32B 5/02; B32B 7/12; B32B 27/12; B32B 37/02; B32B 37/12; B32B 37/144; B32B 38/0012
See application file for complete search history.

(56) References Cited

U.S. PATENT DOCUMENTS 5,393,599 A 2/1995 Quantrille et al.
6,204,207 B1 3/2001 Cederblad et al.
(Continued)

FOREIGN PATENT DOCUMENTS

CN 1694804 A 11/2005
CN 101324030 A 12/2008
(Continued)

OTHER PUBLICATIONS

Manufacturing Case Study SWM, http://www.conwedplastics.com/en/innovation/success-stories/training-pants/.
(Continued)

*Primary Examiner* — Maria V Ewald
*Assistant Examiner* — Ethan Weydemeyer
(74) *Attorney, Agent, or Firm* — KIMBERLY-CLARK WORLDWIDE, INC.

(57) ABSTRACT

A laminate having a cross-machine direction (CD) and a machine direction (MD) includes a core structure having a first surface and a second surface, an elastic net that is elastic in the CD, and a plastic film; and a nonwoven first facing layer affixed to the first surface. A method for producing a laminate includes providing an elastic net layer and a plastic film layer, wherein the elastic net layer is elastic in the CD; stretching the elastic net layer in the CD to less than 100 percent stretch; affixing the plastic film layer to the elastic net layer to form an elastic web having a first surface and a second surface; relaxing the elastic web; affixing a fibrous nonwoven web to the first surface of the elastic web to form (Continued)

a composite nonwoven elastic web; and activating the composite nonwoven elastic web.

18 Claims, 5 Drawing Sheets

(51) Int. Cl.
*B32B 27/12* (2006.01)
*B32B 37/02* (2006.01)
*B32B 37/12* (2006.01)
*B32B 37/14* (2006.01)
*B32B 38/00* (2006.01)

(52) U.S. Cl.
CPC .............. *B32B 37/02* (2013.01); *B32B 37/12* (2013.01); *B32B 37/144* (2013.01); *B32B 38/0012* (2013.01); *B32B 2038/0028* (2013.01); *B32B 2555/00* (2013.01)

(56) References Cited

U.S. PATENT DOCUMENTS

| | | | |
|---|---|---|---|
| 6,206,739 B1 * | 3/2001 | Dadd | B63H 20/14 440/75 |
| 6,355,200 B1 | 3/2002 | Schmidt et al. | |
| 6,537,930 B1 | 3/2003 | Middlesworth et al. | |
| 6,653,523 B1 | 11/2003 | McCormack et al. | |
| 6,964,720 B2 | 11/2005 | Schneider et al. | |
| 7,008,685 B2 | 3/2006 | Groitzsch et al. | |
| 7,625,829 B1 | 12/2009 | Cree et al. | |
| 8,182,624 B2 | 5/2012 | Handziak | |
| 8,292,865 B2 | 10/2012 | Hutson et al. | |
| 8,298,205 B2 | 10/2012 | Norrby et al. | |
| 8,679,992 B2 | 3/2014 | Austin et al. | |
| 8,741,083 B2 | 6/2014 | Wennerbäck et al. | |
| 8,852,372 B2 | 10/2014 | Lakso et al. | |
| 9,040,437 B2 | 5/2015 | Sollmann | |
| 2002/0105110 A1 | 8/2002 | Dobrin et al. | |
| 2003/0104746 A1 | 6/2003 | Menzies et al. | |
| 2005/0101216 A1 | 5/2005 | Middlesworth et al. | |
| 2005/0106971 A1 | 5/2005 | Thomas | |
| 2005/0106980 A1 | 5/2005 | Abed et al. | |
| 2006/0003656 A1 | 1/2006 | Morman | |
| 2006/0131783 A1 | 6/2006 | Morman et al. | |
| 2007/0237924 A1 | 10/2007 | Bruce et al. | |
| 2008/0125736 A1 | 5/2008 | Kline et al. | |
| 2010/0076390 A1 | 3/2010 | Norrby et al. | |
| 2010/0104830 A1 | 4/2010 | Jaeger et al. | |
| 2010/0222761 A1 | 9/2010 | Westwood et al. | |
| 2010/0285286 A1 | 11/2010 | Middlesworth | |
| 2011/0151739 A1 | 6/2011 | Bosler et al. | |
| 2011/0209270 A1 | 9/2011 | Carlson et al. | |
| 2013/0000819 A1 | 1/2013 | Hutson et al. | |
| 2013/0065014 A1 * | 3/2013 | Miyagawa | B32B 5/12 428/113 |
| 2013/0228281 A1 | 9/2013 | Miyagawa et al. | |
| 2019/0047268 A1 | 2/2019 | Nhan et al. | |

FOREIGN PATENT DOCUMENTS

| | | |
|---|---|---|
| CN | 101925459 A | 12/2010 |
| CN | 102076303 A | 5/2011 |
| CN | 202139405 U | 2/2012 |
| CN | 102452192 A | 5/2012 |
| CN | 103502004 A | 1/2014 |
| JP | 4350833 B2 | 10/2009 |
| WO | 03007864 A1 | 1/2003 |
| WO | 09111303 A1 | 9/2009 |
| WO | 2016079608 A1 | 5/2016 |

OTHER PUBLICATIONS

Rebound Elastomeric-Netting SWM, http://www.conwedplastics.com/en/core-products/extruded-netting/elastomeric/.

* cited by examiner

NON-STRETCH BONDED ELASTIC WITH ELASTIC NET

BACKGROUND

The present disclosure is generally directed to processes for forming composite nonwoven elastic webs and the composite nonwoven elastic webs formed by such processes. In particular, the present disclosure encompasses a composite nonwoven elastic web that includes an elastic web joined to a nonwoven web and processes for forming such composite nonwoven elastic webs. In particular, the present disclosure is directed to elastic laminates and their uses in various product applications.

Current elastic materials used in products in the global market are generally based on stretch-bonded elastic laminate technology with a nonwoven facing. In the stretch-bonded elastic laminate process, elastic materials (film or strands) are stretched to 3-5 times their relaxed length before being bonded to facing materials. Cost analyses of current elastic laminates indicate that the facing materials, such as spunbond (SB) and spunbond-meltblown-spunbond (SMS) nonwovens account for more than 50% of the total elastic laminate cost because of the high usage of facing materials.

Current MD-stretchable strand/film elastics laminate can be made with elastic strands deployed on a thin tough plastic film in machine direction and adhesively bonded with low basis weight facing materials together in a non-stretch or a little stretching lamination process. This laminate is then activated through MD groove rolling to break the facing material and extend the plastic film. The resulting elastic laminate is stretchable only in the MD due to the elastic strand laid on machine direction.

Materials that are elastic in the CD without the need to turn the materials are needed in various applications, but are difficult to produce, particularly at production speeds. The CD-stretchable strand/film elastic laminate described herein is critical to some applications because it is much easier to be converted into a product at higher speeds and with less waste generated.

SUMMARY

The composites described herein represent a new class of soft, flexible, and cloth-like nonwoven/film structures that can potentially be used for a variety of applications such as functional elastics, cleaning wipes, medical fabrics, protection garments, filtration, packaging, personal care articles, and others.

In one aspect, a laminate has a cross-machine direction (CD) and a machine direction (MD), the laminate including a core structure having a first surface and a second surface, the core structure comprising an elastic net that is elastic in the CD, and a plastic film, the plastic film reinforcing the core structure in the CD; and a nonwoven first facing layer affixed to the first surface.

In an alternate aspect, a method for producing a composite nonwoven elastic web including an elastic web joined to a fibrous nonwoven web, the composite nonwoven elastic web having a cross-machine direction (CD) and a machine direction (MD), the method including providing an elastic net layer and a plastic film layer, wherein the elastic net layer is elastic in the CD; stretching the elastic net layer in the CD to less than 100 percent stretch; affixing the plastic film layer to the elastic net layer to form an elastic web, wherein the elastic web has a first surface and a second surface; relaxing the elastic web; affixing a fibrous nonwoven web to the first surface of the elastic web to form a composite nonwoven elastic web; and activating the composite nonwoven elastic web.

In another aspect, a laminate has a cross-machine direction (CD) and a machine direction (MD), the laminate including a core structure including a first surface and a second surface, an elastic net that is elastic in the CD and plastic in the MD, and a plastic film affixed to the elastic net, the plastic film reinforcing the core structure in the CD; a nonwoven first facing layer affixed to the first surface with adhesive, wherein the nonwoven first facing layer includes polymer and/or cellulose; and a nonwoven second facing layer affixed to the second surface with adhesive.

Objects and advantages of the disclosure are set forth below in the following description, or can be learned through practice of the disclosure.

BRIEF DESCRIPTION OF THE DRAWINGS

The present disclosure will be more fully understood, and further features will become apparent, when reference is made to the following detailed description and the accompanying drawings. The drawings are merely representative and are not intended to limit the scope of the claims.

Figure 1:
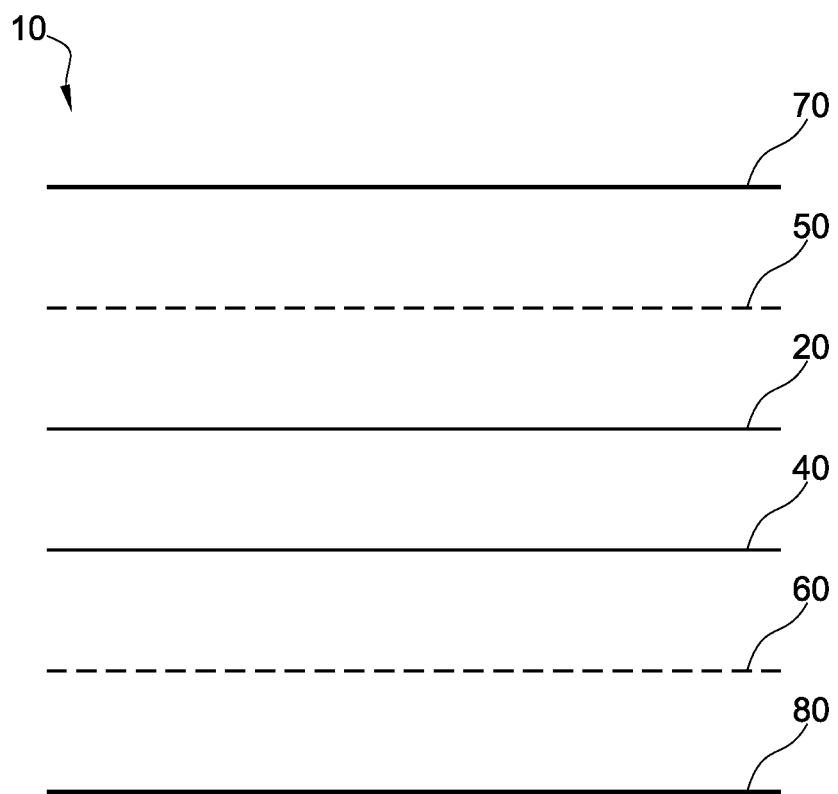
FIG. 1 illustrates an exploded schematic view of an elastic laminate having an elastic layer and a plastic layer in accordance with the present disclosure.

Repeat use of reference characters in the present specification and drawings is intended to represent the same or analogous features or elements of the present disclosure. The drawings are representational and are not necessarily drawn to scale. Certain proportions thereof might be exaggerated, while others might be minimized.

DETAILED DESCRIPTION

As used herein the term "nonwoven fabric or web" refers to a web having a structure of individual polymeric and/or cellulosic fibers or threads that are interlaid, but not in an identifiable manner as in a knitted fabric. Nonwoven fabrics or webs have been formed from many processes such as for example, meltblowing processes, spunbonding processes, bonded carded web processes, those used to make tissue and towels, etc.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which can be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto. Generally speaking, meltblown fibers can be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., U.S. Pat. No. 4,340,563 to Appel, et al. and U.S. Pat. No. 5,382,400 to Pike, et al., which are incorporated herein in their entirety by reference hereto thereto. Spunbond fibers are generally not tacky when they are deposited onto a collecting surface. Spunbond fibers can sometimes have diameters less than about 40 microns, and are often between about 5 to about 20 microns.

As used herein the term "staple fiber" means fibers that have a fiber length generally in the range of about 0.5 to about 150 millimeters. Staple fibers can be cellulosic fibers or non-cellulosic fibers. Some examples of suitable non-cellulosic fibers that can be used include, but are not limited to, hydrophilically-treated polyolefin fibers, polyester fibers, nylon fibers, polyvinyl acetate fibers, and mixtures thereof. Hydrophilic treatments can include durable surface treatments and treatments in polymer resins/blends. Cellulosic staple fibers include for example, pulp, thermomechanical pulp, synthetic cellulosic fibers, modified cellulosic fibers, and the like. Cellulosic fibers can be obtained from secondary or recycled sources. Some examples of suitable cellulosic fiber sources include virgin wood fibers, such as thermomechanical, bleached and unbleached softwood and hardwood pulps. Secondary or recycled cellulosic fibers can be obtained from office waste, newsprint, brown paper stock, and paperboard scrap. Further, vegetable fibers, such as abaca, flax, milkweed, cotton, modified cotton, cotton linters, can also be used as the cellulosic fibers. In addition, synthetic cellulosic fibers such as, for example, rayon, viscose rayon, and lyocell can be used. Modified cellulosic fibers are generally composed of derivatives of cellulose formed by substitution of appropriate radicals (e.g., carboxyl, alkyl, acetate, nitrate, etc.) for hydroxyl groups along the carbon chain. Desirable staple fibers for the purposes of this application are hydrophilic, such as traditional cellulosic fibers (a desirable example of which is pulp fibers, as can be found in rolled tissues and paper-based towels).

As used herein, the term "substantially continuous fibers" is intended to mean fibers that have a length that is greater than the length of staple fibers. The term is intended to include fibers that are continuous, such as spunbond fibers, and fibers that are not continuous, but have a defined length greater than about 150 millimeters.

As used herein "bonded carded webs" or "BOW" refers to nonwoven webs formed by carding processes as are known to those skilled in the art and further described, for example, in U.S. Pat. No. 4,488,928 to Ali Khan et al., which is incorporated herein by reference thereto. Briefly, carding processes involve starting with a blend of, for example, staple fibers with bonding fibers or other bonding components in a bulky ball that is combed or otherwise treated to provide a generally uniform basis weight. This web is heated or otherwise treated to activate the adhesive component resulting in an integrated, usually lofty nonwoven material.

The basis weight of nonwoven webs is usually expressed in ounces of material per square yard (osy) or grams per square meter (gsm) and fiber diameters are usually expressed in microns, or in the case of staple fibers, denier. It is noted that to convert from osy to gsm, multiply osy by 33.91.

As used herein the terms "machine direction" or "MD" generally refers to the direction in which a material is produced. It is also often the direction of travel of the forming surface onto which fibers are deposited during formation of a non-woven web. The term "cross-machine direction" or "CD" refers to the direction perpendicular to the machine direction. Dimensions measured in the cross-machine direction (CD) are referred to as "width" dimensions, while dimensions measured in the machine direction (MD) are referred to as "length" dimensions. The width and length dimensions of a planar sheet make up the X and Y directions of the sheet. The dimension in the depth direction of a planar sheet is also referred to as the Z-direction.

As used herein, the terms "elastomeric" and "elastic" are used interchangeably and shall mean a layer, material, laminate or composite that is generally capable of recovering its shape after deformation when the deforming force is removed. Specifically, when used herein, "elastic" or "elastomeric" is meant to be that property of any material that, upon application of a biasing force, permits the material to be stretchable to a stretched biased length that is at least about fifty (50) percent greater than its relaxed unbiased length, and that will cause the material to recover at least forty (40) percent of its elongation upon release of the stretching force. A hypothetical example that would satisfy this definition of an elastomeric material would be a one (1) inch sample of a material that is elongatable to at least 1.50 inches and that, upon being elongated to 1.50 inches and released, will recover to a length of less than 1.30 inches. Many elastic materials can be stretched by much more than fifty (50) percent of their relaxed length, and many of these will recover to substantially their original relaxed length upon release of the stretching force.

As used herein the term "recover" refers to a contraction of a stretched material upon termination of a biasing force following stretching of the material by application of the biasing force. For example, if a material having a relaxed, unbiased length of one (1) inch was elongated 50 percent by stretching to a length of one and one half (1.5) inches the material would have a stretched length that is 150 percent of its relaxed length. If this exemplary stretched material contracted, that is recovered, to a length of one and one tenth (1.1) inches, after release of the biasing and stretching force, the material would have recovered 80 percent (0.4 inch) of its elongation.

As used herein, the term "g/cc" generally refers to grams per cubic centimeter.

As used herein, the term "hydrophilic" generally refers to fibers or films, or the surfaces of fibers or films that are wettable by aqueous liquids in contact with the fibers. The term "hydrophobic" includes those materials that are not hydrophilic as defined. The phrase "naturally hydrophobic" refers to those materials that are hydrophobic in their chemical composition state without additives or treatments affecting the hydrophobicity.

The degree of wetting of the materials can, in turn, be described in terms of the contact angles and the surface tensions of the liquids and materials involved. Equipment and techniques suitable for measuring the wettability of particular fiber materials or blends of fiber materials can be provided by the Cahn SFA-222 Surface Force Analyzer System, or a substantially equivalent system. When measured with this system, fibers having contact angles less than 90 are designated "wettable" or hydrophilic, and fibers having contact angles greater than 90 are designated "non-wettable" or hydrophobic.

As used herein, the term "personal care product" refers to diapers, training pants, absorbent underpants, adult incontinence products, sanitary wipes and feminine hygiene products, such as sanitary napkins, pads, and liners, and the like. The term "absorbent medical product" is employed to refer to products such as medical bandages, tampons intended for medical, dental, surgical, and/or nasal use, surgical drapes and garments, coverings in medical settings, and the like.

The term "composite" as used herein, refers to a film material that has been bonded to or otherwise exists with a nonwoven web including fibers. The film material itself can be mono-layer, multi-component, or multilayer. The composite can be apertured and breathable, or the film material of the composite can be essentially intact.

The material described herein is a highly CD-stretchable, non-stretch-bonded, elastic laminate including an elastic netting material, a plastic film, and a facing material. These materials are adhesively combined and then subsequently activated through a CD grooved ring rolling process to create a highly CD-stretchable elastic laminate. This material is highly desirable for product applications including personal care product applications such as training pants.

Co-pending PCT Patent Application no. PCT/US16/20017, filed 29 Feb. 2016, describes an MD stretchable strand/film elastics laminate that can be made with elastic strands deployed on a thin tough plastic film in machine direction and adhesively bonded with low basis weight facing materials together in a non-stretch or a little stretching lamination process. The laminate is then activated and regains elasticity through a MD groove rolling (Intermesh gear rolling) to break facing material and extend the plastic film. The elongation and elasticity of the laminate depended on the component nature of the laminate and processing, especially on the engagement of intermeshing gear rolling process in which plastic film is extended. The resulted elastic laminate is stretchable in only the MD due to the elastic strand laid in the MD.

It is very challenging to put elastic strands, for example, in the CD; high speed extrusion would require an intermittent process for elastic strands to be placed in the CD. The technical difficulty involved in placing multiple elastic strands in the CD is a significant impediment to making a CD-stretchable strand/film (S/F) elastic laminate. A CD-stretchable S/F elastic laminate is critical to some applications including the manufacture of training pants because such a CD-stretchable S/F elastic laminate is much easier to be converted into a product at a higher speed, and less waste is generated than in using MD-stretchable elastics. This is because MD-stretchable elastics need to slow down to 20-30% of production speed to be able to be turned 90°, cut, and affixed to the product assembly. All of these result much higher waste (up to 20% or more) than using CD-stretchable elastic laminate.

It was found that a reinforced highly-CD-stretchable S/F elastic laminate can be created with an elastic net and non-stretch bonded to plastic film and facing materials. The laminate is then activated by CD groove ring rolling to create CD-stretchable S/F elastics. A designable stress/strain curve can be determined with engagement of ring rolls for extension of the plastic film. The CD-stretchable elastic laminate formed a unique micro texture surface after groove rolling. This provides preferred properties (e.g., touch/feel in term of soft/gentle) and is more cost effective as compared to current elastics.

Using elastic net to make elastic laminate was mentioned in U.S. Pat. No. 6,204,207. A netting with a low melting point polymer (plastic or elastic) and high melting point polymer (elastic or plastic) can be used to make a laminate. A high melting point polymer elastic strand provides elasticity, and a low melting point polymer plastic strand provide strength and adhesion to fabrics such as a facing material. This elastic laminate cannot provide a controllable stretch to stop, and exhibited poor elasticity due to the facing material limitation.

In the present disclosure, novel reinforced highly-stretchable CD elastics can be made by producing a non-stretch bonded elastic net/film laminate, and activating the laminate to regain elasticity through CD groove ring rolling. The controllable strain to stress curves of the CD elastics can be optimized through changing combination of film, facing, and elastic components as well processing conditions such as groove ring rolling engagements. The highly-CD-stretchable elastics show a unique three-dimensional micro texture on the surface and provide gentle stretching and soft feel benefits for personal care product and other applications.

The present disclosure describes a non- or low-stretch bonded (<100% stretch) elastic laminate that includes one or two external nonwoven layers and an internal plastic layer adjacent to an internal elastic layer, with adhesive layers between the nonwoven layers and the film/elastic layers. The elastic layer can be in the form of a net. The plastic film can be breathable.

The laminate is activated through a groove rolling or intermeshing gears process. The elastic laminate experiences a nearly-complete fracturing of the nonwoven layers while maintaining the continuity of the plastic layer. This allows the ability to design the stress/strain properties of the laminate while also maintaining the stretch-to-stop requirements for consumer-preferred fit characteristics. This provides a low cost, soft/gentle, more underwear-like elastic material for personal care garment and other applications.

Current elastic materials used in products in the global market are generally based on stretch-bonded elastic laminate technology with a nonwoven facing. In the stretch-bonded elastic laminate process, elastic materials (film or strands) are stretched to 3-5 times their relaxed length before being bonded to facing materials. Cost analyses of current elastic laminates indicate that the facing materials, such as spunbond (SB) and spunbond-meltblown-spunbond (SMS) nonwovens, account for more than 50% of the total elastic laminate cost because of the high usage of facing materials.

As a result of the work described herein, it was found, for example, that a non-stretch bonded elastic net combined with a thin/strong plastic film and facing materials can provide superior performance with a lower cost than the current stretch-bonded elastic laminate materials. The groove rolling process results in the nearly-complete fracturing of the nonwoven layers while maintaining the continuity of the plastic layer. This allows the ability to design the stress/strain properties of the laminate while also maintaining the stretch-to-stop requirements for consumer-preferred fit characteristics. Furthermore, the non-stretch bonded elastic laminate of this invention also unexpectedly creates desirable surface texture and appearance that can provide a more consumer-preferred appearance in terms of lighter, softer/gentler, and more cloth-like.

More specifically, the elastic laminate of the present disclosure can include an elastic net and a plastic film non-stretch bonded to a nonwoven. In a particular aspect of the present disclosure illustrated in FIG. 1, an elastic laminate 10 includes a core structure having a first surface and a second surface, the core structure including an elastic core layer 20 and a plastic core layer 40. The elastic core layer 20 is netting that is elastic in at least the CD. The plastic core layer 40 is a film layer. The plastic core layer 40 reinforces the core structure in both the CD and the MD. The elastic laminate 10 can also include one or two low basis weight (~8 gsm) facing materials 70, 80 affixed to the core structure by any suitable means. In one aspect of the present application, the facing materials 70, 80 are affixed to the core structure with adhesive bonding layers 50, 60. In other aspects, the elastic laminate 10 can be manufactured without one or both facing materials 70, 80.

Figure 3:
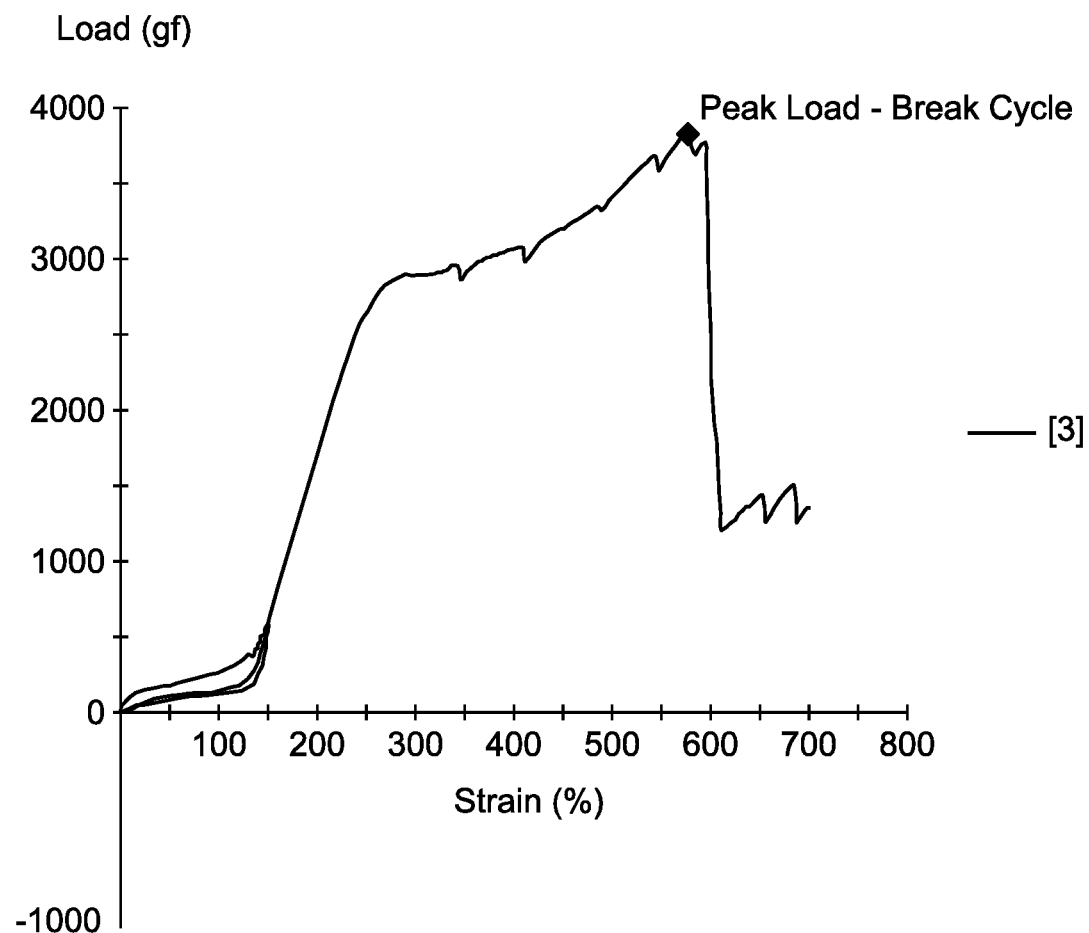
FIG. 3 graphically illustrates a Strain/Stress curve of the CD stretchable elastic net/film laminate with 8 gsm MB facing of the present disclosure.

The elastic core layer 20 is adhesively bonded to the plastic core layer 40 and facing materials 70, 80 under little or no elongation (<100%). The elastic laminate 10 after manufacturing has a very little elasticity and the laminate 10 is not an elastic material at this point (maximum elongation is less than 20% with minimum tension). The laminate 10 is then stretched (200-300%) in the cross direction (CD) using a groove rolling technique, an intermeshing gears process, or any other suitable process. This stretching locally tears the facing materials 70, 80, extends the plastic core layer 40 up to 20-300% depending on processing conditions, and turns the laminate 10 into a very elastic material with up to 150-250% elongation and with designable tension and S-S curves as shown in FIG. 3, and as described in more detail below.

The elastic laminate 10 in this aspect permanently exhibits a fine regular and periodic three-dimensional structure even under maximum stretching conditions. In contrast, current stretch-bonded elastic laminates demonstrate a generally flat surface when under maximum stretching conditions. The fine three-dimensional surface structure of the laminate 10 provides a more consumer-preferred premier appearance and softer/gentler feel. In this aspect, the plastic core layer 40 functions to provide strength and a stretch-to-stop property to the elastic laminate 10. The elastic core layer 20 contributes elastic performance for seal, fit, and comfort functions when employed in a personal care article. The facing materials 70, 80 provide a cloth-like appearance to the elastic laminate 10.

Examples of suitable films for the plastic core layer 40 include a high strength and/or extendable plastic film, whether single or multilayer, incorporated into the laminate 10 to provide a designable tear/poke-through strength as well controllable stretch-to-stop curves for product application and consumer prefer appearance attributes. Examples of suitable films include but are not limited to wrap polyfilm, both polypropylene (PP)- and polyethylene (PE)-based, breathable outer cover film, and organoclay nanocomposite film. A specific example of a suitable film for the plastic core layer 40 includes LLDPE 0.8 mil stretch wrap (SW) film.

The elastic core layer 20 is netting that is elastic in at least the CD. One example of a suitable elastic netting material is CONWED X30014 netting material available from Conwed Global Netting Solutions. This elastic netting material is highly stretchable in the CD (>700%), but not in the MD (<200%). The CD strands of this elastic netting material are KRATON brand styrenic block copolymer (SBC)-based polymer available from Kraton Performance Polymers. The MD strands of this elastic netting material are plastic polyolefin (polyethylene-based).

The facing materials can be any suitable material including nonwovens such as tissue, spunbond, meltblown, or any other suitable cellulose- or polymer-based material. Low basis weight and/or low strength nonwovens can provide a cloth-like appearance with softer and gentler touch after activation.

The materials that can be used to form the fibrous nonwoven web or facing materials 70, 80 include any nonwoven material capable of performing as described above. For example, the facing materials 70, 80 can be formed from a blend of a non-elastic material with an elastic material, one or more non-elastic materials or a blend of one or more elastic materials with two or more non-elastic materials. Preferably, the facing materials 70, 80 are formed from a fiber-forming meltblowable or spunbondable non-elastic gatherable material. However, the facing materials 70, 80 can be formed by depositing a carded web on the surface of the core structure or by any other method which may be utilized to form facing materials 70, 80 on the surface of the core structure. Exemplary fiber-forming materials for use in forming the facing materials 70, 80 are polyester materials, polyolefin materials or blends of one or more polyester materials with one or more polyolefin materials. An exemplary polyester fiber-forming material is polyethylene terephthalate. An exemplary fiber-forming polyolefin material is polypropylene. Preferred polypropylene materials may be obtained from the Himont Company under the trade designations PC 973 and PF 301. All components can be adhesively laminated or extrusion laminated. Specific examples of suitable materials for the facing materials include 12 gsm bonded carded web (BCW) and 8 gsm meltblown (MB).

The adhesive employed to bond the facing materials to the elastic/plastic layers can be any suitable adhesive.

In other aspects of the present disclosure, the non-stretch bonding of the layers of the elastic laminate 10 can be also accomplished by any other suitable method including, but not limited to, thermal, ultrasonic, and extrusion lamination bonding.

Ring rolling is well known in the art. Examples of descriptions of the process include those in patent application EP650714 to Coles et al. entitled "Method of making an absorbent article using an activatable composite elastic member."

After CD groove rolling, the elongation (stretch to stop) of the laminate is up to approximately 150% with a stretching force near 3000-4000 g/in, depending on the plastic film and facing material. The tactile properties of the activated laminate are improved, with a gentler and softer feel, and with a fine three-dimensional micro texture.

Non-stretch bonded strand/film elastic laminates as described herein demonstrate performance enhancements including premier appearance, gentle and soft feel and touch, increased strength through strand enforcement, controllable stretch-to-stop curves (100-250%), and breathable but liquid impermeable performance. In addition, the elastic laminate 10 described herein demonstrates a cost that is less than current elastic laminates because the elastic laminate 10 has a basis weight that can be reduced to up to 50 percent of the basis weight of current elastic laminates made from stretch-bonded laminate processes.

After the facing materials 70, 80 have been formed upon or affixed to the upper surface of the core structure, the composite nonwoven elastic web 10 is passed through rollers that, for the reasons stated above, need not be heated or need not apply any excessive pressure to the core structure. Thereafter, the stretching and biasing force on the core structure is released so as to relax and contract the composite nonwoven elastic web 10.

Reference now will be made in detail to various aspects of the disclosure, one or more examples of which are set forth below. Each example is provided by way of explanation, not of limitation of the disclosure. In fact, it will be apparent to those skilled in the art that various modifications and variations can be made in the present disclosure without departing from the scope or spirit of the disclosure. For instance, features illustrated or described as part of one aspect, can be used on another aspect to yield a still further aspect. Thus it is intended that the present disclosure cover such modifications and variations.

EXAMPLES

A novel CD-stretchable Strand/Film elastic laminate with enhanced physical properties can be made including, for example, a CD-stretchable elastic net material available from Conwed Global Netting Solutions, with the properties listed in Table 1.

TABLE 1

Properties of CD-Stretchable Elastic Net Material

| Basis Weight | 59 | gsm |
|---|---|---|
| MD Strand Count | ~11.5 | Strands/inch |
| CD Strand Count | 2.4 | Strands/inch |
| MD Strength | 8.1 | kg/3" |
| MD Elongation | 197 | % |
| CD Force @ 50% | 392 | g/3" (7 strands) |
| CD Force @ 100% | 520 | g/3" (7 strands) |
| CD Force @ 200% | 833 | g/3" (7 strands) |
| CD Strength | 3.7 | kg/3" (7 strands) |
| CD Elongation | 718 | % |

Figure 2:
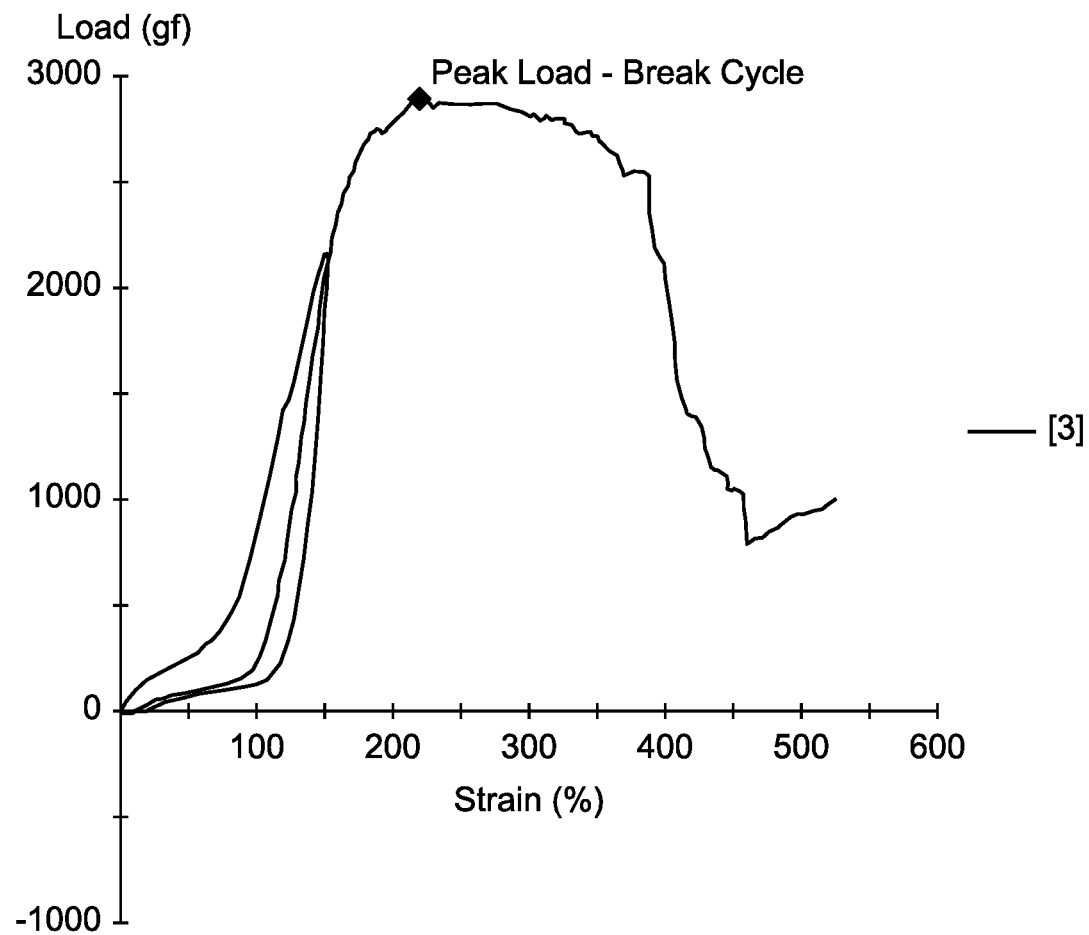
FIG. 2 graphically illustrates a Strain/Stress curve of the CD stretchable elastic net/film laminate with 12 gsm BCW facing of the present disclosure.

In which the CD strand is a KRATON styrene block copolymer (SBC)-based polymer, and the MD strand is a plastic polyolefin (PE-based). The basis weights for the CD and MD strands are roughly same at approximately 30 gsm. The ultimate elongation (stretch to break) of the CD strand can be >700% as see in the Table 2 below. To manufacture the CD-stretchable S/F elastic laminate, the elastic net material from Conwed Global Netting Solutions was adhesively laminated with stretch wrap film (LLPDE-based polymer, 0.8 mil thickness) and 8 gsm PP meltblown facings. The laminate showed minimal stretch (<5%) when in the form of the original lamination. The laminate was then activated to regain elasticity through groove ring rolling. After groove rolling the elongation (stretch to stop) of the laminate was up to ~150% with stretching force near 3000-4000 g/in, depending on the plastic film and facing material. FIGS. 2-3 show the Strain/Stress curves of the CD-stretchable elastic net/film (SW LLPDE-based polymer, 0.8 mil thickness) laminate with 12 gsm BCW facings and 8 gsm MB facings, respectively. This clearly-indicated stretch force and strain curve can be tailored by changing the plastic film, the facing, and/or the elastic net to fit a particular product application requirement.

TABLE 2

Primary physical properties of non-stretch bonded elastic net/film laminate

| Code | Facing | Film | Elastic Net | Burst strength (gf) | Burst energy (g*cm) | Burst Peak Elongation (mm) | Tensile Peak load (gf) |
|---|---|---|---|---|---|---|---|
| A | 12 gsm BCW | 0.8 mil LLDPE SW | Conwed (X30014) | 3384.5 | 6401.3 | 57.9 | 2985.7 |
| B | 8 gsm MB | 0.8 mil LLDPE SW | Conwed (X30014) | 2580.3 | 9424 | 76.1 | 3580.8 |

Figure 4:
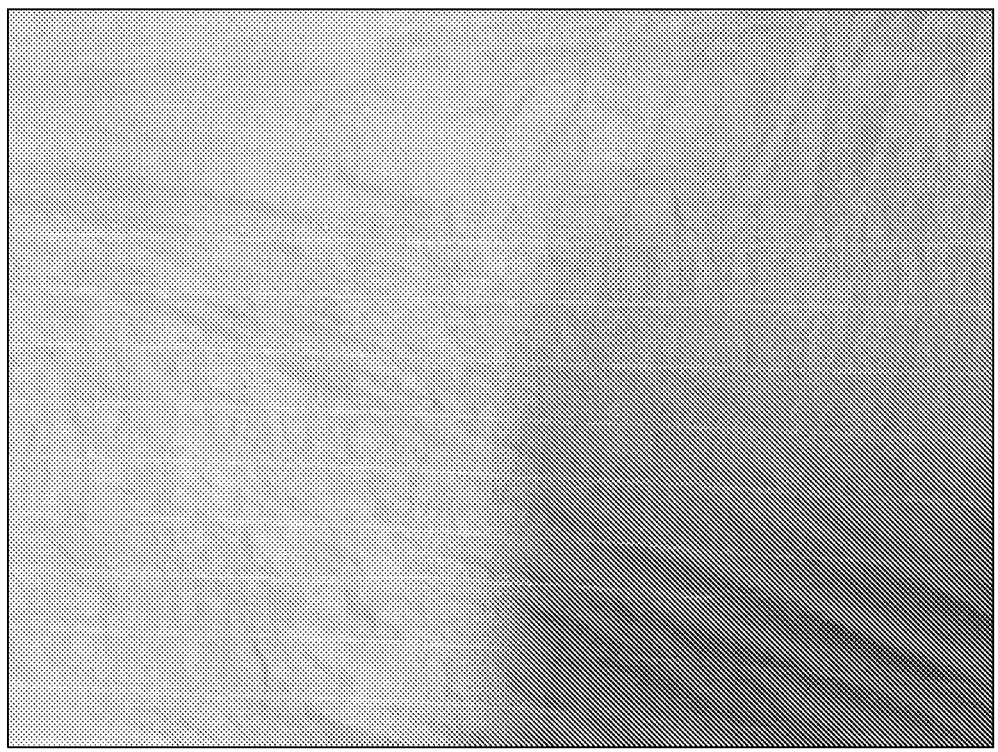
FIG. 4 photographically illustrates a typical elastic laminate during stretching in which the surface shows a flat surface with a lack of soft feel.
Figure 5:
FIG. 5 photographically illustrates a CD-stretchable elastic net/film laminate of the present disclosure showing a three-dimensional microtexture surface having a much softer feel.

Another benefit of the non-stretch bonded S/F CD elastics is a unique three-dimensional surface structure as compared to flat surface of a typical elastic laminate (FIG. 4), which lacks a soft feel. The unique, regular, fine three-dimensional micro texture on the surface of the elastic net/film laminate (FIG. 5) gives a gentler and softer feel. The surface texture can be changed with the spacing of the net strand as well engagement of intermeshing to satisfy consumer needs.

The sheet materials produced in accordance with this disclosure can be used in a variety of end product applications. It is contemplated that such sheet materials have end product applications including in the technical areas of filtration, medical garments, covers, and bandages, and the personal care area, such as in the ears or side panels of baby/child care diapers, and adult feminine care applications. Articles made under this disclosure are very flexible and soft with a cloth-like feel.

In a first particular aspect, a laminate has a cross-machine direction (CD) and a machine direction (MD), the laminate including a core structure having a first surface and a second surface, the core structure comprising an elastic net that is elastic in the CD, and a plastic film, the plastic film reinforcing the core structure in the CD; and a nonwoven first facing layer affixed to the first surface.

A second particular aspect includes the first particular aspect, wherein the elastic net is disposed between the film layer and the first facing layer.

A third particular aspect includes the first and/or second aspect, wherein the first facing layer is affixed to the first surface with adhesive.

A fourth particular aspect includes one or more of aspects 1-3, further comprising a nonwoven second facing layer affixed to the second surface.

A fifth particular aspect includes one or more of aspects 1-4, wherein the nonwoven first facing layer is cellulose-based.

A sixth particular aspect includes one or more of aspects 1-5, wherein the nonwoven first facing layer is polymer-based.

A seventh particular aspect includes one or more of aspects 1-6, wherein the nonwoven first layer includes polymer and cellulose.

An eighth particular aspect includes one or more of aspects 1-7, wherein the elastic net is plastic in the MD.

In a ninth particular aspect, a method for producing a composite nonwoven elastic web including an elastic web joined to a fibrous nonwoven web, the composite nonwoven elastic web having a cross-machine direction (CD) and a machine direction (MD), the method including providing an elastic net layer and a plastic film layer, wherein the elastic net layer is elastic in the CD; stretching the elastic net layer in the CD to less than 100 percent stretch; affixing the plastic film layer to the elastic net layer to form an elastic web, wherein the elastic web has a first surface and a second surface; relaxing the elastic web; affixing a fibrous nonwoven web to the first surface of the elastic web to form a composite nonwoven elastic web; and activating the composite nonwoven elastic web.

A tenth particular aspect includes the ninth particular aspect, wherein activating includes using a groove rolling process or an intermeshing gears process.

An eleventh particular aspect includes the ninth and/or tenth aspect, wherein the fibrous nonwoven web is affixed to the elastic web with a thermal, adhesive, ultrasonic, or co-extrusion lamination method.

A twelfth particular aspect includes one or more of aspects 9-11, further comprising affixing a second fibrous nonwoven web to the second surface.

A thirteenth particular aspect includes one or more of aspects 9-12, wherein the fibrous nonwoven web is cellulose-based.

A fourteenth particular aspect includes one or more of aspects 9-13, wherein the fibrous nonwoven web is polymer-based.

A fifteenth particular aspect includes one or more of aspects 9-14, wherein the fibrous nonwoven web includes polymer and cellulose.

A sixteenth particular aspect includes one or more of aspects 9-15, wherein the plastic film layer is affixed to the elastic net layer using adhesive.

A seventeenth particular aspect includes one or more of aspects 9-16, wherein the fibrous nonwoven web is affixed to the first surface of the elastic web using adhesive.

In an eighteenth particular aspect, a laminate has a cross-machine direction (CD) and a machine direction (MD), the laminate including a core structure including a first surface and a second surface, an elastic net that is elastic in the CD and plastic in the MD, and a plastic film affixed to the elastic net, the plastic film reinforcing the core structure in the CD; a nonwoven first facing layer affixed to the first surface with adhesive, wherein the nonwoven first facing layer includes polymer and/or cellulose; and a nonwoven second facing layer affixed to the second surface with adhesive.

A nineteenth particular aspect includes the eighteenth particular aspect, wherein the elastic net is disposed between the film layer and the nonwoven first facing layer.

A twentieth particular aspect includes the eighteenth and/or nineteenth aspect, wherein the nonwoven first facing layer is polymer-based.

While the disclosure has been described in detail with respect to the specific aspects thereof, it will be appreciated that those skilled in the art, upon attaining an understanding of the foregoing, can readily conceive of alterations to, variations of, and equivalents to these aspects. Accordingly, the scope of the present disclosure should be assessed as that of the appended claims and any equivalents thereto.

What is claimed is:

1. A laminate having a cross-machine direction (CD) and a machine direction (MD), the laminate comprising:
   a core structure having a first surface and a second surface, the core structure comprising an elastic net that is elastic in the CD, and a plastic film, the plastic film reinforcing the core structure in the CD; and
   a nonwoven first facing layer affixed to the first surface;
   wherein the elastic net comprises CD strands and MD strands, wherein the elastic net is disposed between the plastic film and the nonwoven first facing layer, wherein the elastic net is affixed to the nonwoven first facing layer and the plastic film with less than 100% stretch in the CD for the elastic net, and wherein the nonwoven first facing layer is torn.

2. The laminate of claim 1, wherein the nonwoven first facing layer is affixed to the first surface with adhesive.

3. The laminate of claim 1, further comprising a nonwoven second facing layer affixed to the second surface.

4. The laminate of claim 1, wherein the nonwoven first facing layer is cellulose-based.

5. The laminate of claim 1, wherein the nonwoven first facing layer is polymer-based.

6. The laminate of claim 1, wherein the nonwoven first facing layer includes polymer and cellulose.

7. The laminate of claim 1, wherein the elastic net is plastic in the MD.

8. A method for producing a composite nonwoven elastic web comprising an elastic web joined to a fibrous nonwoven web, the composite nonwoven elastic web having a cross-machine direction (CD) and a machine direction (MD), the method comprising:
   providing an elastic net layer and a plastic film layer, wherein the elastic net layer is elastic in the CD and comprises CD strands and MD strands;
   stretching the elastic net layer in the CD to less than 100 percent stretch;
   affixing the plastic film layer to the elastic net layer to form an elastic web, wherein the elastic web has a first surface and a second surface;
   relaxing the elastic web;
   affixing a fibrous nonwoven web to the first surface of the elastic web while the elastic net layer is stretched in the CD to less than 100 percent stretch such that the elastic net layer is disposed between the plastic film layer and the fibrous nonwoven web to form a composite nonwoven elastic web; and
   activating the composite nonwoven elastic web.

9. The method of claim 8, wherein activating includes using a groove rolling process or an intermeshing gears process.

10. The method of claim 8, wherein the fibrous nonwoven web is affixed to the elastic web with a thermal, adhesive, ultrasonic, or co-extrusion lamination method.

11. The method of claim 8, further comprising affixing a second fibrous nonwoven web to the second surface.

12. The method of claim 8, wherein the fibrous nonwoven web is cellulose-based.

13. The method of claim 8, wherein the fibrous nonwoven web is polymer-based.

14. The method of claim 8, wherein the fibrous nonwoven web includes polymer and cellulose.

15. The method of claim 8, wherein the plastic film layer is affixed to the elastic net layer using adhesive.

16. The method of claim 8, wherein the fibrous nonwoven web is affixed to the first surface of the elastic web using adhesive.

17. A laminate having a cross-machine direction (CD) and a machine direction (MD), the laminate comprising:
    a core structure comprising
       a first surface and a second surface,
       an elastic net that is elastic in the CD and plastic in the MD, the elastic net comprising CD strands and MD strands, and a plastic film affixed to the elastic net, the plastic film reinforcing the core structure in the CD;

a nonwoven first facing layer affixed to the first surface with adhesive, wherein the elastic net is disposed between the plastic film and the nonwoven first facing layer, wherein the elastic net is affixed to the nonwoven first facing layer and the plastic film with less than 100% stretch in the CD for the elastic net, and wherein the nonwoven first facing layer includes polymer and/or cellulose; and a nonwoven second facing layer affixed to the second surface with adhesive;

wherein the nonwoven first facing layer and the nonwoven second facing layer are torn.

18. The laminate of claim 17, wherein the nonwoven first facing layer is polymer-based.

* * * * *